United States Patent [19]

Jackson et al.

[11] 4,160,609
[45] Jul. 10, 1979

[54] CONNECTOR FOR BOLTED JOINTS

[75] Inventors: David B. Jackson, Rampton; Keith T. Sisson, Mansfield, both of England

[73] Assignee: Hollybank Engineering Company Limited, Aylesbury, England

[21] Appl. No.: 872,755

[22] Filed: Jan. 27, 1978

[51] Int. Cl.² ........................ B25G 3/00; F16D 1/00; F16G 11/00
[52] U.S. Cl. .................................. 403/407; 403/340; 403/309; 403/331
[58] Field of Search ............... 403/331, 340, 309, 344, 403/407, 241, 364

[56] References Cited

U.S. PATENT DOCUMENTS

| | | | |
|---|---|---|---|
| 713,227 | 11/1902 | Levalley | 403/344 |
| 714,605 | 11/1902 | Potter | 403/344 |
| 1,331,776 | 2/1920 | Lewis | 403/331 |
| 2,565,065 | 8/1951 | Chakeres | 403/407 |

Primary Examiner—Wayne L. Shedd
Attorney, Agent, or Firm—Diller, Ramik & Wight

[57] ABSTRACT

A connector for a bolted joint mounted or adapted to be mounted on a member to be connected and comprising a base portion and a key portion. Opposed faces of the connector define a channel, the key portion being of complementary shape to the channel so that the connector can be coupled to another similar connector with each of the key portions received in the channel of the other connector. A bore for receiving a bolt extends through the connector and is positioned to register with a bore of a similar connector when the connectors are coupled together.

7 Claims, 3 Drawing Figures

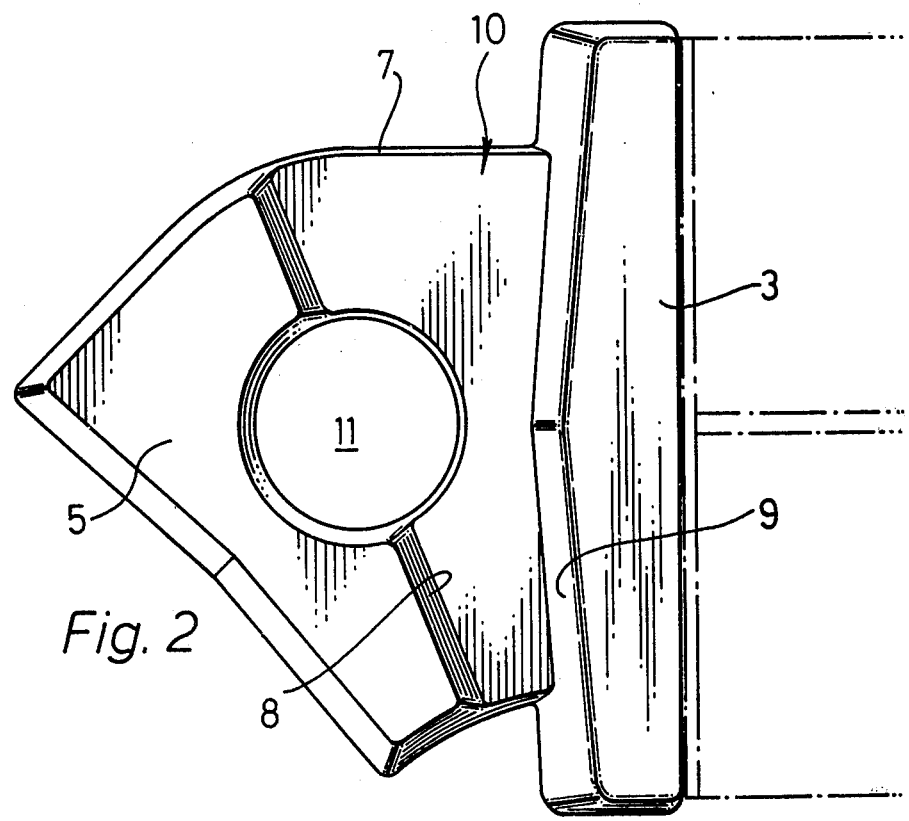
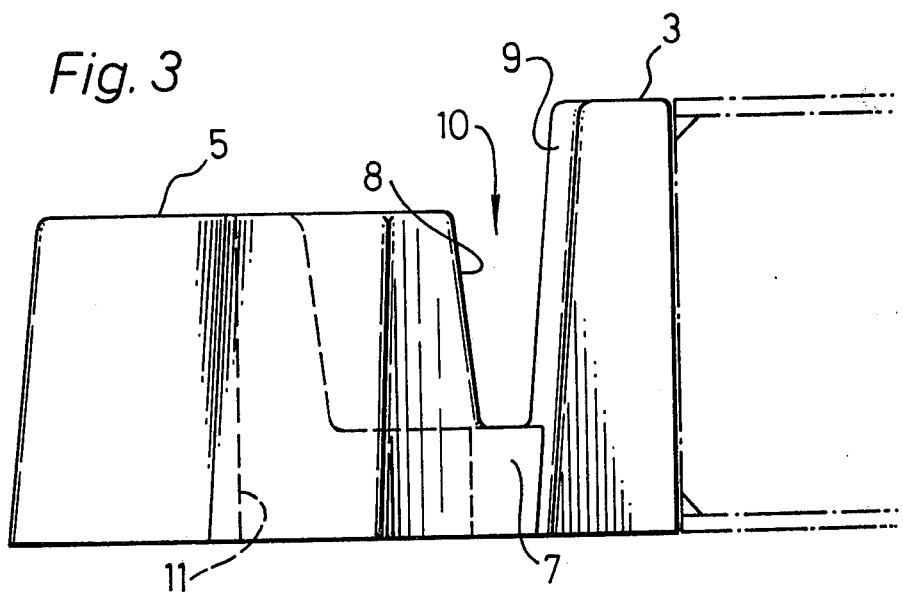

CONNECTOR FOR BOLTED JOINTS

This invention relates to connectors for bolted joints, particularly for bolted joints which may be subjected to high stresses, for example the joints of mine roof supports.

Roof supports in underground mine roadways or tunnels are usually composed of steel beams of L-, T- or I-cross section and may be of any desired shape, semi-circular, arched, or rectangular. The limited space available in an underground excavation creates difficulties in transporting, erecting and handling roof supports, and necessitates the manufacture of the roof supports in relatively short sections which are assembled in the mine.

Usually the steel beam sections are fastened together by means of fishplates, i.e. drilled plates of sheet steel which are bolted to adjacent sections of the roof supports. Since four or more bolts are usually required for each fishplate, the assembly of the roof supports is laborious and slow.

According to the present invention we provide a connector for a bolted joint mounted or adapted to be mounted on a member to be connected and comprising a base portion and a key portion, opposed faces of which define a channel, the key portion being of complementary shape to the channel so that the connector can be coupled to another similar connector with each of the key portions received in the channel of the other connector, and a bore receiving a bolt extending through the connector and positioned to register with a bore of a similar connector when the connectors are coupled together.

In use, two of the connectors are coupled together with their respective key portions received in the channel of the other connector. As a result, relative movement of the connectors transversely to the channels, i.e. substantially normally to the opposed faces of the wall portions, is prevented. A threaded bolt is then passed through the aligned bores of the connections and the two connectors are then secured together by a nut on the bolt, thus preventing the key portions of each connectors from disengaging from the channel of the other connector.

Since movement of the connectors in a direction transverse to the channel is prevented by engagement of the key portions in the channels, any stress which is applied to the joint in this transverse direction is carried by the connectors and not by the bolt. The risk of fracture of the bolt is therefore minimised.

The connectors may be formed integrally with the members to be joined. Preferably however the connectors are formed as separate units for attachment to the members to be joined. Where the members to be joined are steel beams, the connectors are suitably attached to the beams by welding.

Preferably the opposed faces of the key portions are inclined so that the channel tapers towards its base. On assembly the two connectors then become firmly wedged together.

The base and key portions of the connector may extend parallel with each other, thus forming a straight connection between two members. If it is desired to connect together two members at an angle to each other, the base and key portions are disposed at an angle to each other so that the channel tapers along its length.

Although the connectors may be provided with more than one bolt hole, this requires a plurality of nuts and bolts for assembly. Preferably each connector includes a single bolt hole. The bolt hole usually extends parallel to the opposed faces of the base and key, i.e. upwardly through the base of the channel.

In order that the invention may be better understood, an embodiment thereof will now be described, by way of example only, with reference to the drawing in which:

FIG. 2 is a plan view of a connector incorporated in the assembly of FIG. 1 and

FIG. 3 is an elevation of the connector of FIG. 2.

Figure 1:
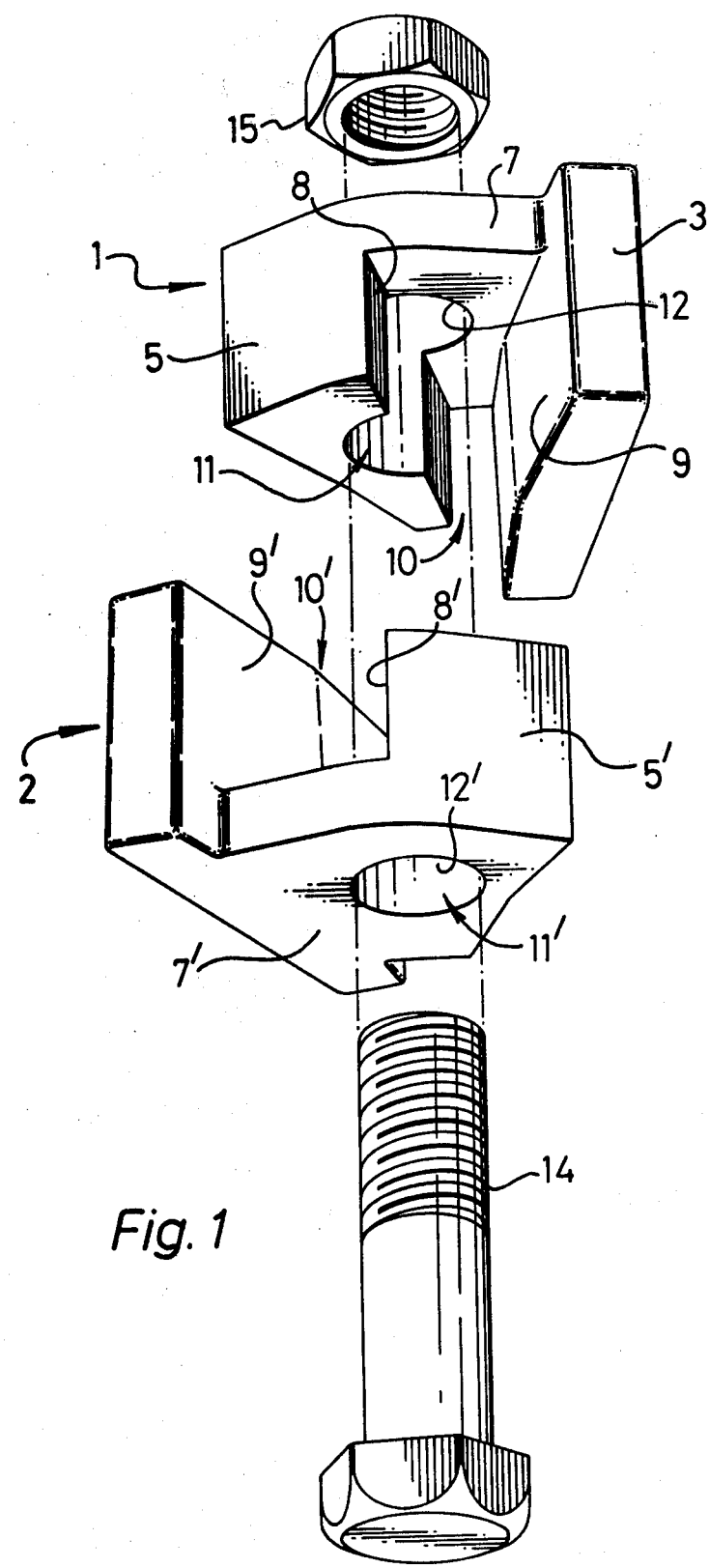
FIG. 1 is a perspective view of a preferred coupling assembly

Referring to the drawings, the coupling assembly comprises two identical connectors 1, 2, each of which comprises a rectangular base portion 3, 3' connected to a key portion 5, 5' by an intermediate wall 7, 7'. In each connector, opposed faces 8, 8', 9, 9' of the key 5, 5' and the base 3, 3' define a channel 10, 10'. These faces 8, 8', 9, 9' converge towards the bases of the channels 10, 10'. In the embodiment illustrated, the opposed faces of the bases 3, 3' and keys 5, 5' also converge towards each other along the length of the channels 10, 10' so that the channels 10, 10' taper towards one end.

The keys 5, 5' are complementary in shape to the channels 10, 10' so that the two connectors 1, 2 can be coupled together, the key 5, 5' of each connector being received in the channel 10, 10' of the other connector. The convergence of the opposed faces 8, 8', 9, 9' of the channel 10, 10' ensures that each key 5, 5' is a snug fit in the channel 10, 10' of the other connector.

A bore 11, 11' extends through each of the connectors 1, 2. This bore comprises a hole 12, 12' in the intermediate wall 7, 7' and a semi-cylindrical recess in the face 8, 8' of the key defining the channel 10, 10'. The bores 11, 11' extend downwardly towards the base of the channels 10, 10' generally parallel to the planes of the opposed faces 8, 8' 9, 9' of the keys 5, 5' and bases 3, 3' and are arranged centrally along the length of the keys 7, 7' so that the two bores are aligned when the connectors are joined together. A threaded bolt 14 can then be inserted through the aligned bores 11, 11' and the two connectors can be secured together on the bolt 14 by a nut 15.

In use, the connectors 1, 2 can be butt-welded onto the ends of two members to be connected, for example two lengths of I-section steel beam which make up part of a mine roof support. Alternatively they can be attached to flange faces of girders, tees etc, as desired. The sections can then be jointed together in situ by inserting the keys 5, 5' of each connector into the channels 10, 10' of the other connector. The bolt 14 is then inserted through the bores 11, 11' and is secured in place by tightening the nut 15.

The two lengths of steel beam are therefore coupled together using a single bolt, which greatly facilitates assembly. When the complete roof support is assembled, compressive forces exerted on the connection along the lengths of the beams are absorbed by the abutting faces 8, 8', 9, 9' of the keys and bases, and are not transmitted to the bolt 14. Moreover, the relative configuration of the two connectors is determined by the relative angles of the bases 4, 5 and keys 5, 5'. Consequently the connections move into the desired configuration on tightening the nut 15.

It will be appreciated that the coupling illustrated in the drawings allows two lengths of beam to be connected to each other at an angle determined by the mutual angle of inclination of the keys 5, 5' and bases 3, 3'.

If it is desired to connect two beams together at a different angle to each other, or collinearly, it is necessary to use connectors in which the bases and keys are either mutually inclined at different angles or parallel to each other.

The connectors are preferably manufactured by casting or by forging. In either case they are conveniently manufactured in pairs, in "back-to-back" configuration, i.e. with the two bases 3, 3' fused along their faces remote from the channel 10, 10'. The two connectors are then separated by sawing to reveal a freshly cut face which is very suitable for welding to I-section beams, as indicated in broken lines in FIGS. 2 and 3.

We claim:

1. A connector for a bolted joint adapted to be mounted on a member to be connected to another member, the connector comprising:
   a base portion, an intermediate portion and a key portion;
   opposed faces of said base and key portion being inclined and defining a channel which tapers convergingly towards its base, which is provided by said intermediate portion, said opposing faces of said base and key portion also being disposed at an angle to each other so that the channel tapers along its length, said key portion being of complementary shape to said channel so that said connector can be clamped to another similar connector with each of said key portions received in the channel of the other connector, and wherein said connector has a bore therein for receiving a bolt extending through the connector and positioned to register with a bore of a similar connector when the connectors are clamped together by said bolt.

2. A connector according to claim 1 having a single bore.

3. A connector according to claim 1, wherein the bore extends parallel to the opposed faces of said base portion and said key portion.

4. A connector for a bolted joint adapted to be mounted on a member to be connected to another member, said connector comprising a base portion, an intermediate portion and a key portion, opposed faces of said base and key portions being so inclined as to define a channel which tapers convergingly towards its base and tapers along its length, said base being provided by said intermediate portion, said key portion being complementary to said channel so that said connector can be clamped to another similar connector with the key portion of each connector received in the channel of the other connector, and including a single bore extending through said connector with its longitudinal axis extending generally at right angles to the base of said channel, said bore being positioned to register with a bore of a similar connector when the connectors are clamped together by a bolt extending through the bores.

5. A connector according to claim 4, wherein the bore includes a hole in said intermediate portion and a semicircular recess in the face of said key defining said channel.

6. A connector according to claim 4, wherein both the face of said base and the face of said key are inclined and form an obtuse angle with the base of said channel.

7. A connector according to claim 4 wherein the taper of said channel along its length defines two distinct differently tapered channel portions.

* * * * *

UNITED STATES PATENT OFFICE
CERTIFICATE OF CORRECTION

PATENT NO. : 4,160,609
DATED : July 10, 1979
INVENTOR(S) : David Brook Jackson

It is certified that error appears in the above-identified patent and that said Letters Patent are hereby corrected as shown below:

-- [30]    Foreign application priority data

February 10, 1977   United Kingdom   5491/77 --.

Signed and Sealed this

Second Day of October 1979

[SEAL]

Attest:

RUTH C. MASON
*Attesting Officer*

LUTRELLE F. PARKER
*Acting Commissioner of Patents and Trademarks*